United States Patent
Plavetich (10) Patent No.: US 7,832,790 B2
(45) Date of Patent: Nov. 16, 2010

(54) VEHICLE DOOR STRUCTURE

(75) Inventor: Richard Plavetich, Laguna Beach, CA (US)

(73) Assignee: Nissan Design America, Inc., San Diego, CA (US)

( * ) Notice: Subject to any disclaimer, the term of this patent is extended or adjusted under 35 U.S.C. 154(b) by 42 days.

(21) Appl. No.: 12/264,041

(22) Filed: Nov. 3, 2008

(65) Prior Publication Data

US 2010/0109376 A1 May 6, 2010

(51) Int. Cl.
*B60J 5/02* (2006.01)

(52) U.S. Cl. .............................. 296/146.12; 296/146.7; 296/146.8

(58) Field of Classification Search ............ 296/146.12, 296/146.11, 147, 146.7, 146.8, 202
See application file for complete search history.

(56) References Cited

U.S. PATENT DOCUMENTS

| 4,688,844 A | * | 8/1987 | Hirose et al. .................. 296/76 |
| 4,866,883 A | * | 9/1989 | Brown et al. .................. 49/502 |
| 6,000,747 A | * | 12/1999 | Sehgal et al. ............ 296/146.8 |
| 6,382,705 B1 | | 5/2002 | Lang et al. |
| 6,520,557 B2 | | 2/2003 | Benthaus et al. |
| 6,733,063 B2 | * | 5/2004 | Paiva et al. .................. 296/56 |
| 7,328,932 B2 | | 2/2008 | Plavetich et al. |

\* cited by examiner

*Primary Examiner*—Joseph D Pape
(74) *Attorney, Agent, or Firm*—Global IP Counselors, LLP (57) ABSTRACT

A vehicle door structure includes a vehicle structure formed with an opening, an interior panel and an exterior door. The interior panel is supported to the vehicle structure for pivotal movement by a first hinge arrangement about a first pivot axis. The exterior door is supported to the vehicle structure for pivotal movement by a second hinge arrangement about a second pivot axis that is spaced apart from the first pivot axis. The exterior door is also supported to the interior panel such that the interior panel and the exterior door move together as the exterior door is moved between an open position and a closed position.

20 Claims, 12 Drawing Sheets

VEHICLE DOOR STRUCTURE

BACKGROUND OF THE INVENTION

1. Field of the Invention

The present invention relates to a vehicle door structure. More specifically, the present invention relates to vehicle door structure that includes an exterior door and an interior panel supported to a vehicle for pivotal movement about separate pivot axes where the interior panel moves with the exterior door and also supports the exterior door.

2. Background Information

Many personal and commercial vehicles, such as cargo vans, include upright cargo doors that pivot about vertical axes in order to access cargo space. Such cargo doors are typically located at a rear of such vehicles pivoting between a closed position covering a cargo space opening and an open position exposing the cargo space opening. Preferably, the opening and the upright cargo doors are as large as possible in order to maximize the access to the cargo space and allow movement of large objects in and out of the opening and the cargo space.

In recent years, such personal and commercial vehicles have been designed to include contoured side panels where one section of each side panel is vertically offset from another section of the side panel. Such designs enhance the appearance of the vehicle and in some designs can improve aerodynamics. The offset sections of these side panels present challenges for vehicle designers. The offset sections of the side panels create a narrowed area that is most prominent when viewing the vehicle from the front or rear. More specifically, the upper region of the vehicle body can be narrower than the lower region of the vehicle body.

In order to adequately support the large cargo doors, the effective hinge length of the hinge arrangement of the cargo doors must be relatively large. The effective hinge length of the hinge arrangement is defined as the distance between the uppermost end of an upper hinge and the lowermost end of a lower hinge of the hinge arrangement. Typically, the effective hinge length of the hinge arrangement of the cargo door is greater than half the height of the cargo door, and preferably approximately two-thirds of the height of the cargo door.

A problem is created by the inclusion of such offset sections of the side panels in the vehicle design. It is desirable to have a large opening requiring large doors to access the opening. However, in order for the doors to pivot about vertical axes, the size of the opening must be narrowed in order to accommodate a hinge arrangement with a typical effective hinge length. With a narrowed upper region of the vehicle body, the vertically oriented pivot axes (and hence door hinges) must be moved inward from the narrowest part of the vehicle.

In view of the above, it will be apparent to those skilled in the art from this disclosure that there exists a need for an improved vehicle structure that provides support for vehicle cargo doors without reducing the size of the cargo opening. This invention addresses this need in the art as well as other needs, which will become apparent to those skilled in the art from this disclosure.

SUMMARY OF THE INVENTION

One object of the present invention is to provide a vehicle structure where the size of an opening concealed by exterior doors is maximized.

Another object of the present invention is to provide a vehicle structure with an exterior door that is adequately supported and also has a hinge arrangement with minimized effective hinge length.

Still another object of the present invention is to provide a vehicle structure that includes an exterior door with an interior panel that is hinged to the vehicle separately from the exterior door where the interior panel provides support for the exterior door.

In accordance with one aspect of the present invention, a vehicle door structure includes a vehicle structure formed with an opening, an interior panel and an exterior door. The interior panel is supported to the vehicle structure for pivotal movement by a first hinge arrangement about a first pivot axis. The exterior door is supported to the vehicle structure for pivotal movement by a second hinge arrangement about a second pivot axis that is spaced apart from the first pivot axis. The exterior door is supported to the interior panel such that the interior panel and the exterior door move together as the exterior door is moved between an open position and a closed position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
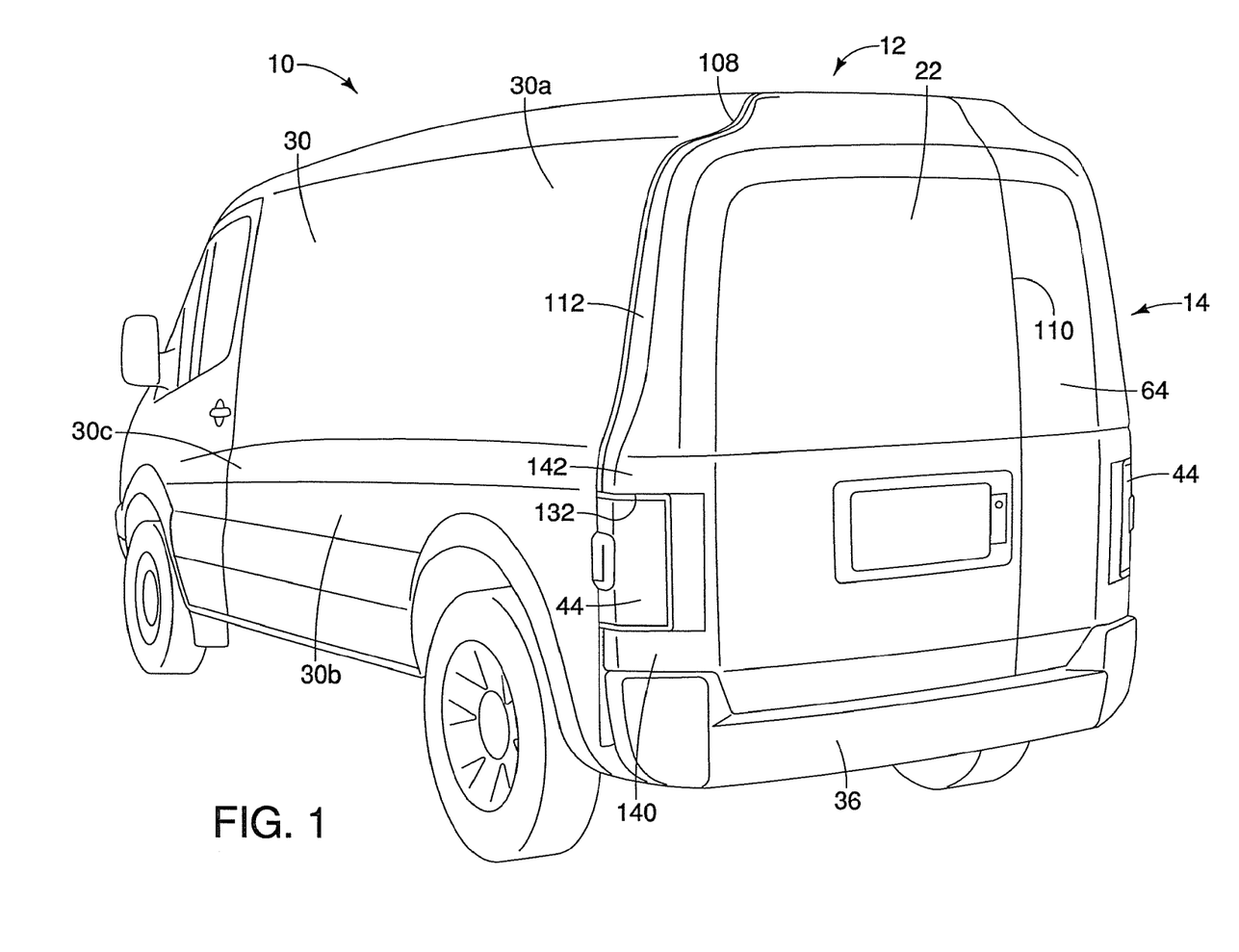
FIG. 1 is a rear perspective view of a vehicle showing a door structure that includes an exterior door in accordance with the present invention.
Figure 2:
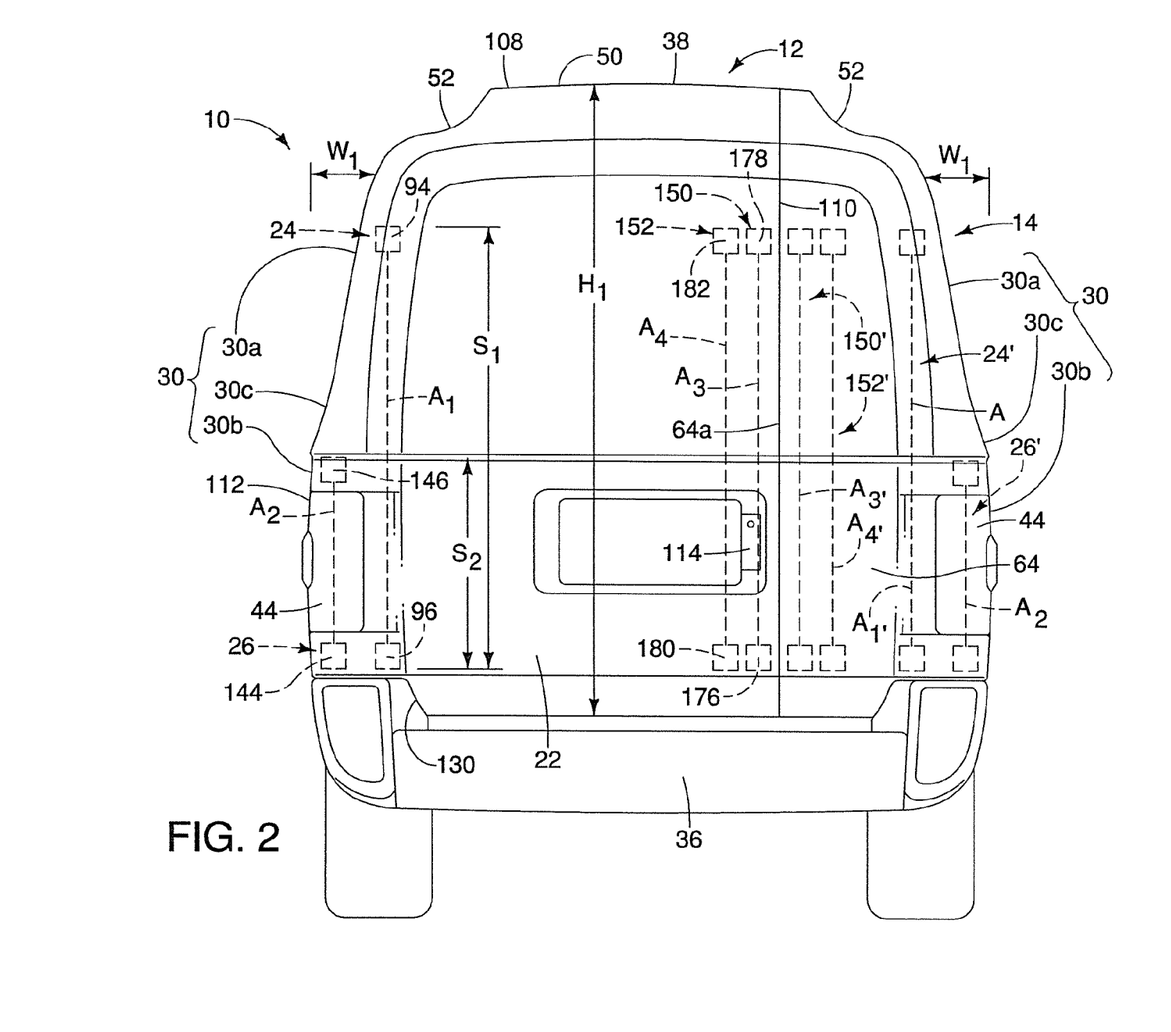
FIG. 2 is a rear view of the vehicle depicted in FIG. 1 with the exterior door in a closed position showing various aspects of the door structure including in phantom hinge arrangements for the exterior door, an additional exterior door, an interior panel and an additional interior panel in accordance with the present invention.

Referring initially to FIGS. 1 and 2, a vehicle 10 is illustrated in accordance with a first embodiment of the present invention. The vehicle 10 includes a vehicle structure 12 and a unique door structure 14 that are both described in greater detail below.

Figure 3:
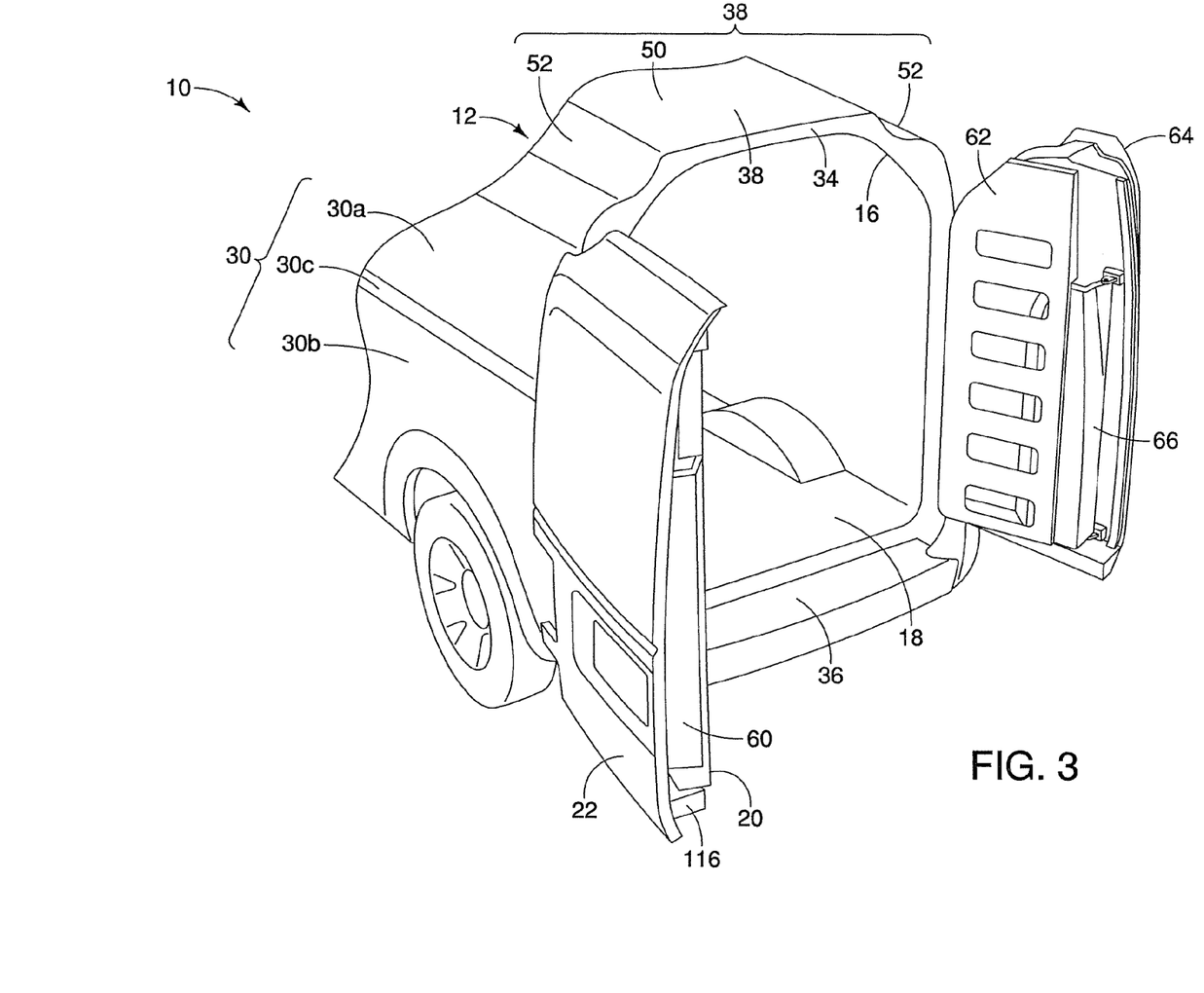
FIG. 3 is another rear perspective view of the vehicle depicted in FIGS. 1 and 2, from a different angle, showing the exterior door, the additional exterior door, the interior panel and the additional interior panel in an open position in accordance with the present invention.
Figure 4:
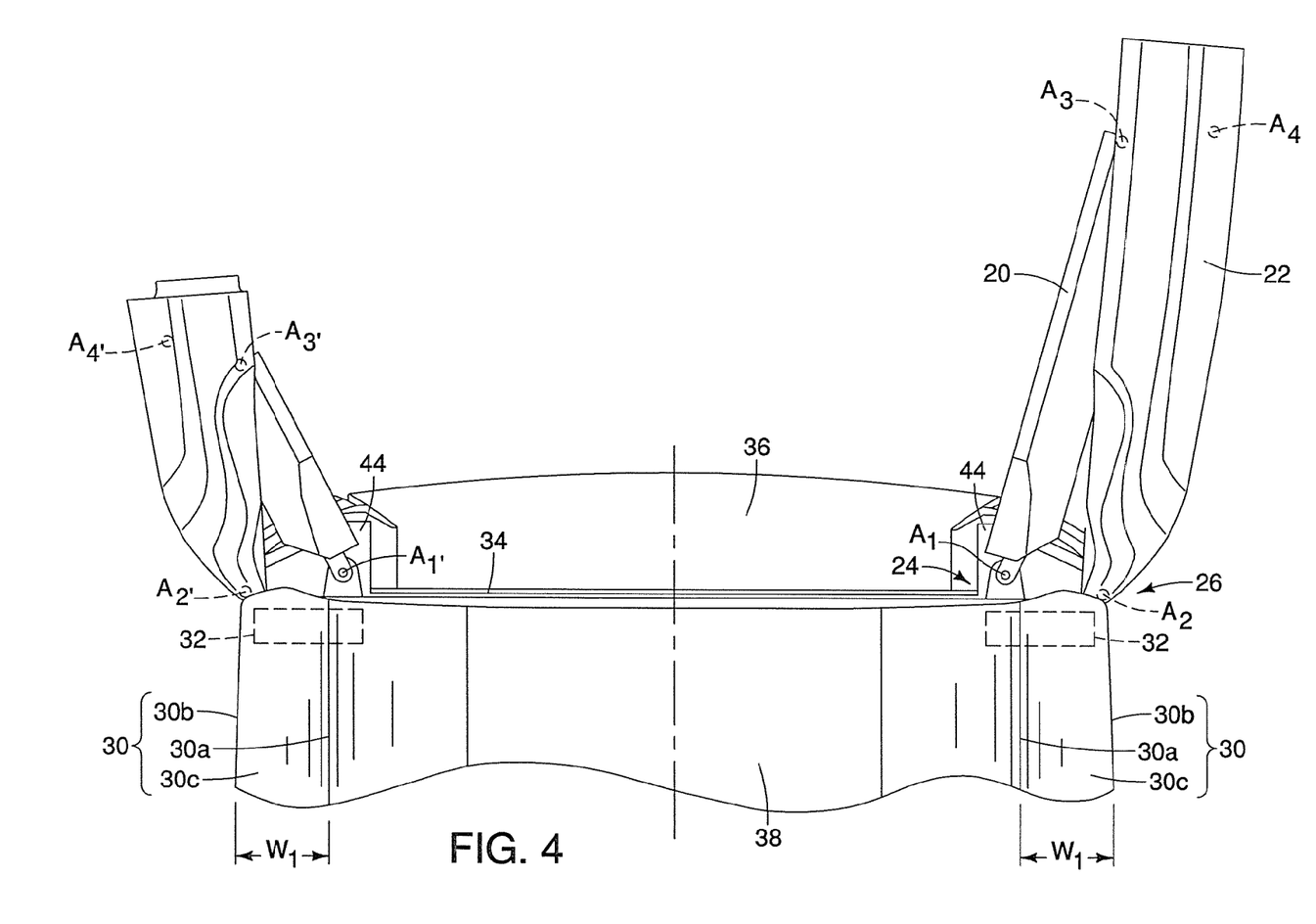
FIG. 4 is a top view of the vehicle depicted in FIGS. 1-3 showing the exterior door, the additional exterior door, the interior panel and the additional interior panel in the open position in accordance with the present invention.

As best shown in FIGS. 3 and 4, the vehicle structure 12 is formed with an opening 16 at a rearward portion of the vehicle 10 exposing a cargo area 18. The door structure 14 includes an interior panel 20 and an exterior door 22. The interior panel 20 is pivotally supported to the vehicle structure 12 for pivotal movement by a first hinge arrangement 24 about a first pivot axis $A_1$ shown in FIGS. 2 and 4. The exterior door 22 is pivotally supported to the vehicle structure 12 for pivotal movement by a second hinge arrangement 26 about a second pivot axis $A_2$ that is spaced apart from the first pivot axis $A_1$.

Figure 5:
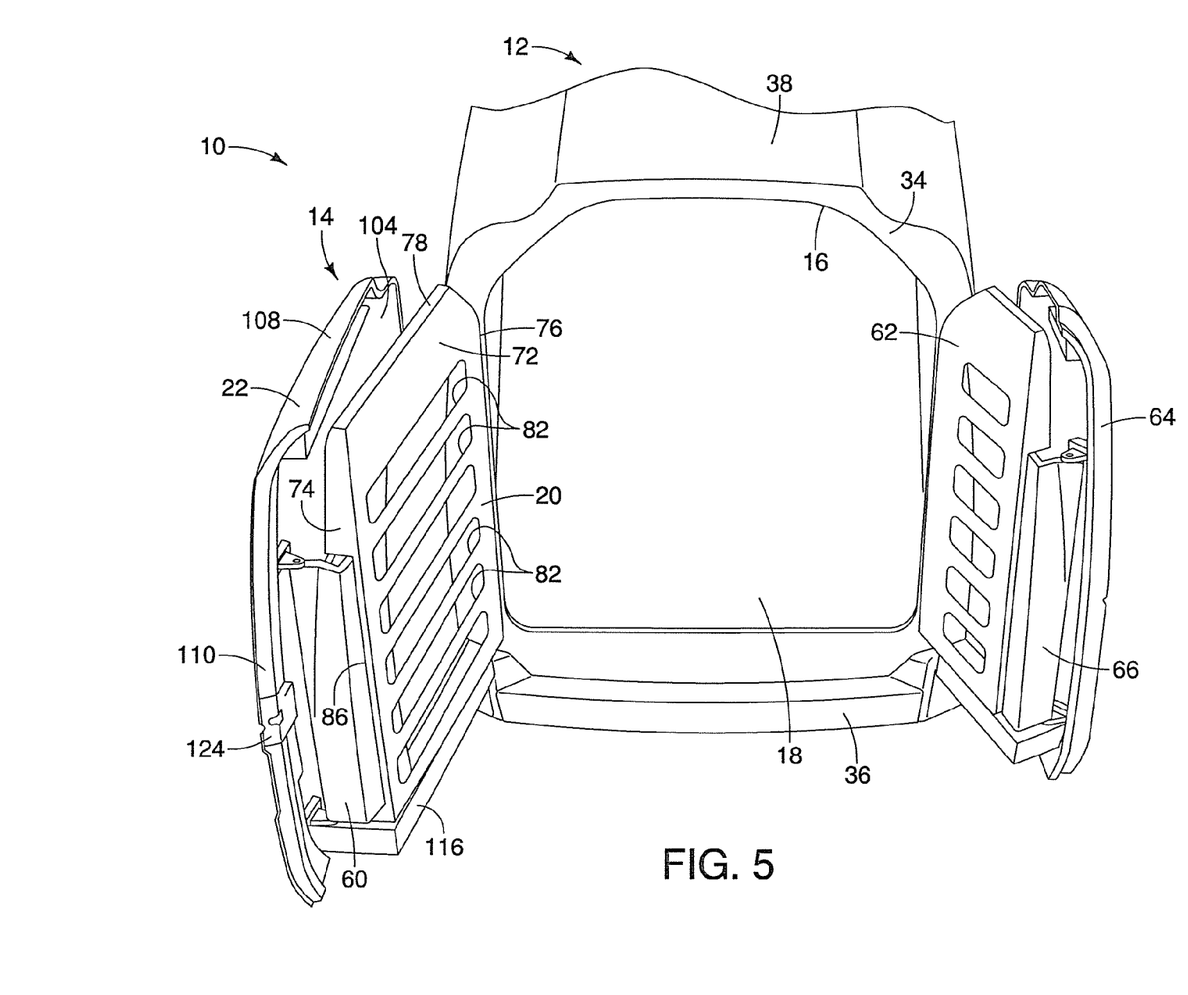
FIG. 5 is another rear perspective view of the vehicle depicted in FIGS. 1-4 from another different angle, showing the exterior door, the additional exterior door, the interior panel and the additional interior panel in the open position and further showing an intermediate panel that slaves movement of the interior panel to movement of the exterior door and an additional intermediate panel connected to each of the additional exterior door and the additional interior panel in accordance with the present invention.
Figure 12:
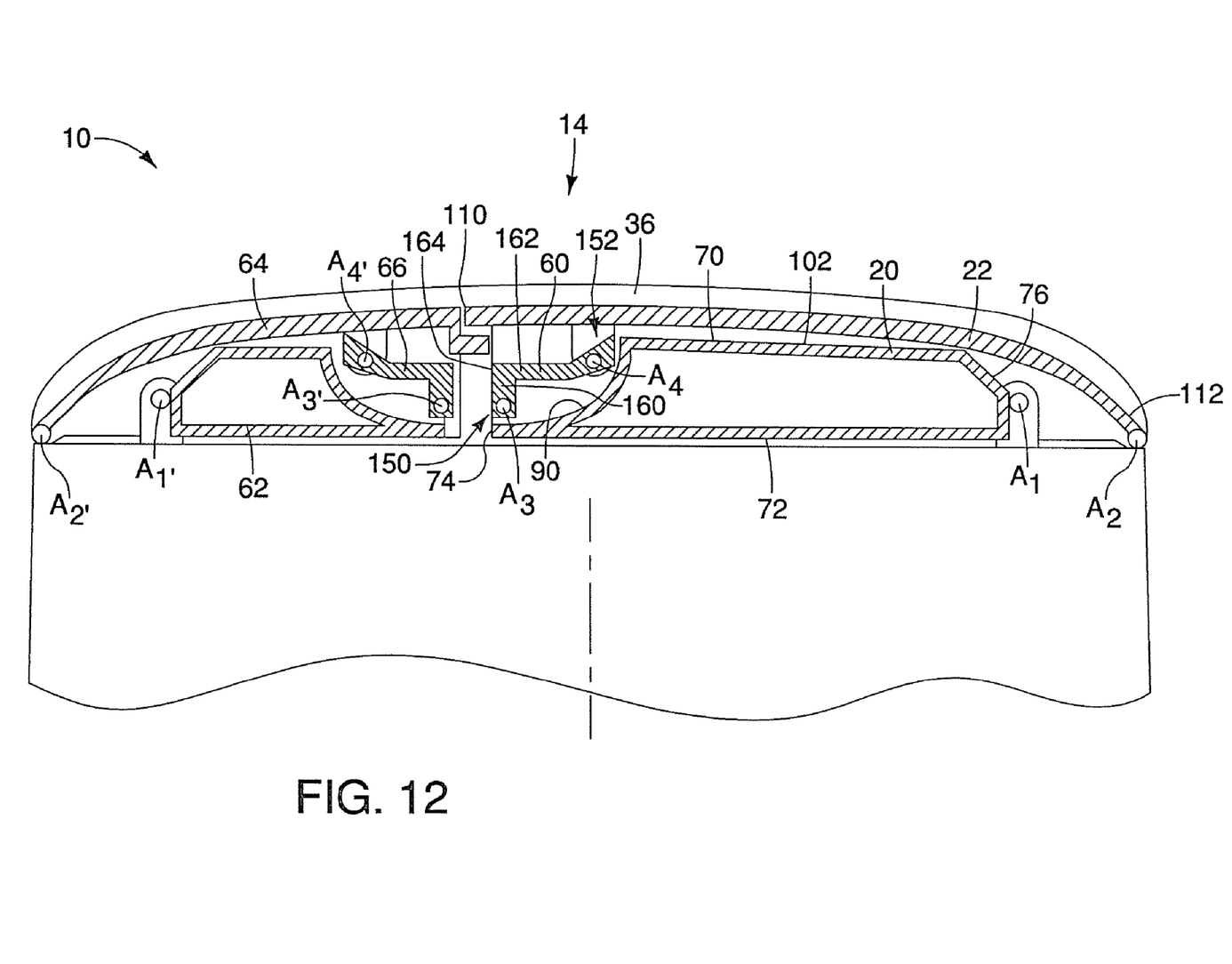
FIG. 12 is another top cross-sectional view of the rear of the vehicle showing the exterior door, the additional exterior door, the interior panel, the additional interior panel the intermediate panel and the additional intermediate panel in the closed position in accordance with the present invention.

The exterior door 22 is also supported to the interior panel 20 such that the interior panel 20 and the exterior door 22 move together as the exterior door 22 is moved between an open position exposing the opening 16, as shown in FIGS. 3 and 5, and a closed position at least partially concealing the opening 16, as shown in FIGS. 1, 2 and 12 and described in greater detail below.

A more detailed description of portions of the vehicle structure 12 related to the present invention is now provided with specific reference to FIGS. 2, 3 and 4. The vehicle structure 12 basically includes, among other things, a pair of side panel portions 30, rear pillar structures 32 (shown in phantom in FIG. 4), a rear panel 34 (FIG. 3-5), a bumper assembly 36, a roof panel 38 and the cargo area 18. Each of the side panel portions 30 has contoured surfaces that are best shown in FIG. 2. Specifically, each side panel portion 30 has an upper section 30a, a lower section 30b and a curved section 30c extending therebetween. As best shown in FIG. 3, the opening 16 is located at the rear end of the vehicle structure 12 between the side panel portions 30.

As indicated in FIG. 4, the rear pillar structures 32 are basically conventional D-pillar structures that support the side panel portions 30, the roof panel 38, the rear panel 34, the first hinge arrangement 24 and the second hinge arrangement 26. The rear pillar structures 32 also support tail lamp assemblies 44, as shown in FIGS. 1, 2, 4 and 10. The tail lamp assemblies 44 are conventional vehicle components. Consequently, description of the tail lamp assemblies 44 is omitted for the sake of brevity.

The rear panel 34 is preferably a flat shaped panel that partially surrounds and defines the opening 16. The rear panel 34 is fixed to the rear pillar structures 32 in a conventional manner, for example, by welding. Although not shown, one of the exterior door 22 and the rear panel 34 is provided with a conventional door seal and the other of the exterior door 22 and the rear panel 34 is provide with a smooth sealing surface. Since such sealing arrangements are conventional, further description is omitted for the sake of brevity.

As best shown in FIGS. 2 and 4, the uppermost end of the upper sections 30a of the side panel portions 30 are offset inwardly in a horizontal direction from respective ones of the lower sections 38 by an offset $W_1$. Consequently, proximate at least the rear of the vehicle 10, the upper region of the vehicle structure 12 is narrower than the lower region of the vehicle structure 12.

The roof panel 38 extends between respective uppermost ends of the upper sections 30a of the side panel portions 30, as best shown in FIGS. 2 and 3. The roof panel 38 includes a slightly curved center section 50 and two contoured sections 52 on opposite sides of the center section 50. The contoured sections 52 preferably are joined seamlessly with uppermost ends of the side panel portions 30.

It should be understood from the drawings and description herein that the specific shapes and contours of the side panel portions 30 and the roof panel 38 are not limited to the example shown in the figures. The depicted embodiment shows the side panel portions 30 and roof panel 38 with curved contours than can be more pronounced (more curvaceous) or can include more clearly defined boundaries with sharp corners, square corners or intersections. More specifically, the door structure 14 of the present invention can be employed with any of a variety of vehicle structure shapes and contours and is not limited to use with the specific shapes and contours of the side panel portions 30 and roof panel 38 depicted in the drawings.

Figure 11:
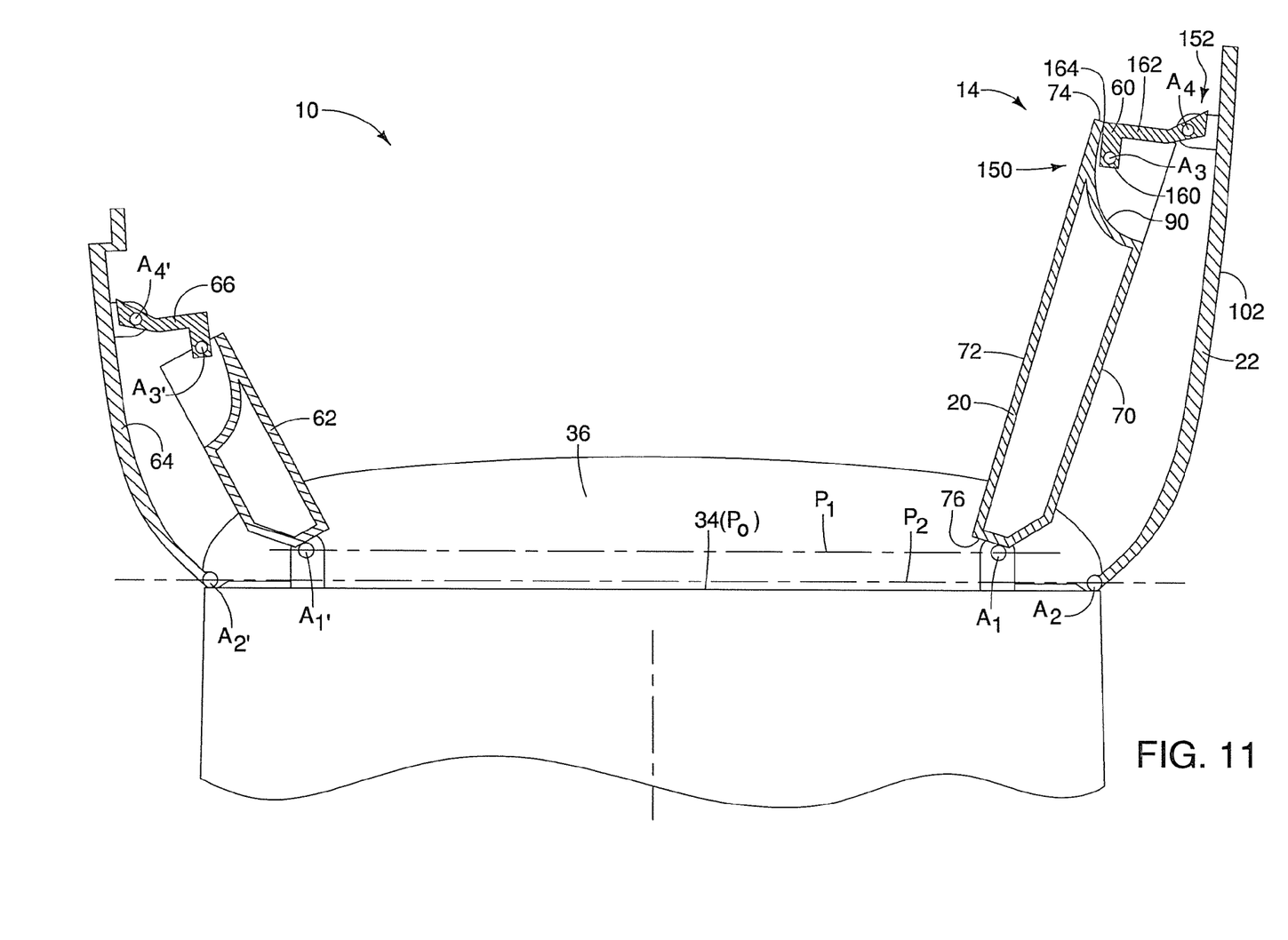
FIG. 11 is a top cross-sectional view of the rear of the vehicle showing the exterior door, the additional exterior door, the interior panel, the additional interior panel the intermediate panel and the additional intermediate panel in the open position in accordance with the present invention.

As best shown in FIG. 4, the first pivot axis $A_1$ of the first hinge arrangement 24 is disposed laterally inward of the upper sections 30a of the side panel portions 30 and the second pivot axis $A_2$ of the second hinge arrangement 26 is disposed laterally outward of the upper sections 30a of the side panel portions 30. As indicated in FIGS. 2, 11 and 12, the second hinge arrangement 26 and the second pivot axis $A_2$ are disposed close to the adjacent one of the side panel portions 30.

A detailed description of the door structure 14 is now provided with specific reference to FIGS. 5-14. The door structure 14 includes the interior panel 20 (FIGS. 5-9 and 11-12), the exterior door 22 (FIGS. 5-6 and 8-12), an intermediate panel 60 (FIGS. 5-6, 8-9 and 11-12), an additional interior panel 62 (FIGS. 5, 11-12 and 14), an additional exterior door 64 (FIGS. 5, 11-12 and 14) and an additional intermediate panel 66 (FIGS. 5, 11-12 and 14).

The interior panel 20 can be made from any of a variety of materials or combination of materials such as metal, metal alloys, a polymer material, plastic material, composite materials, wood, wood veneer products and/or combinations thereof. Regardless of the materials used to construct the interior panel 20, the interior panel 20 is configured and dimensioned to support its own weight, the weight of potential cargo (not shown) that can be loaded within the interior panel 20 and a significant portion of the downward gravitational force acting on the exterior door 22 when the exterior door 22 is in the open position.

The interior panel 20 basically includes a back section 70 (FIGS. 10-12), a front section 72 (FIGS. 5-9 and 11-12), a first side section 74 (FIGS. 5-6, 8-9 and 11-12), a second side section 76 (FIGS. 5-8 and 10-12), an upper end section 78 (FIGS. 5-6), a bottom section 80 (FIGS. 6 and 8) and the first hinge arrangement 24 (FIGS. 2, 4, 7 and 11-12). As best shown in FIGS. 5-9, the front section 72 includes a plurality of bin openings 82 that expose a plurality of corresponding compartments 84 that are configured to store cargo, such as equipment or hardware (not shown). The compartments 84 are separated from one another by horizontal surfaces or shelves formed or installed within the interior panel 20 that extend between the back section 70, the front section 72, the first side section 74 and the second side section 76. The compartments 84 (interior bins) are accessed via the bin openings 82.

Figure 6:
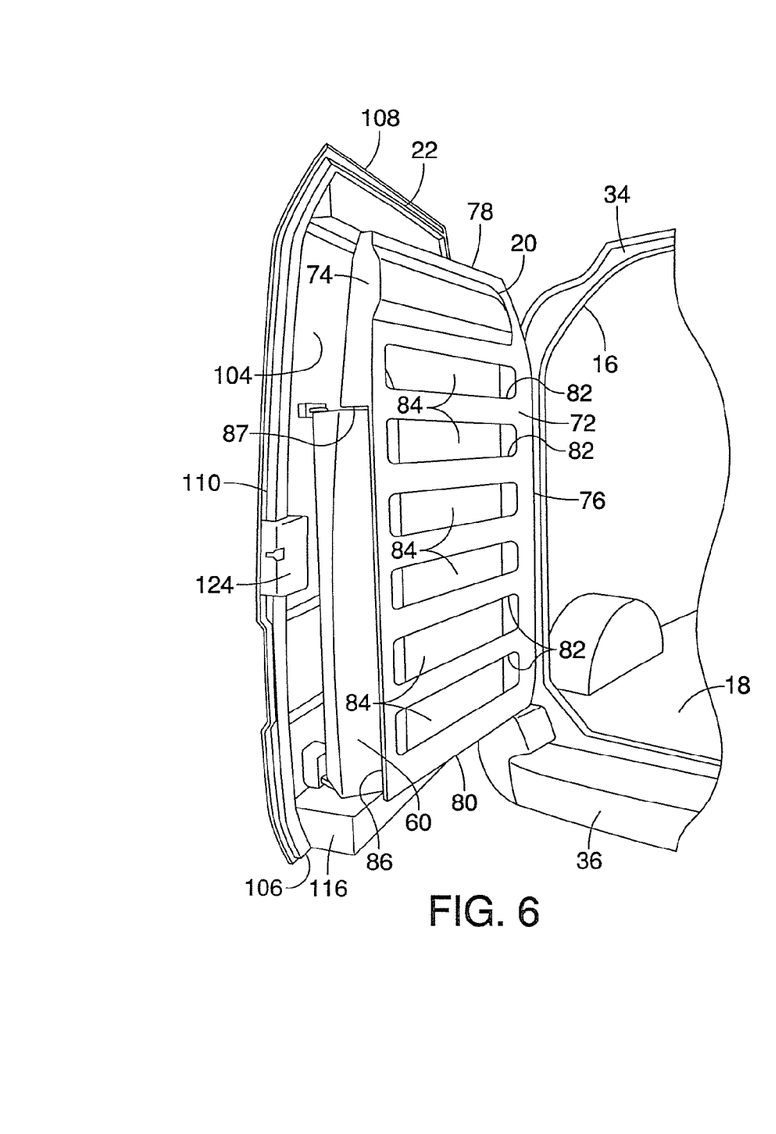
FIG. 6 is a perspective view of an inner side of the exterior door and the interior panel showing details of the intermediate panel in accordance with the present invention.
Figure 8:
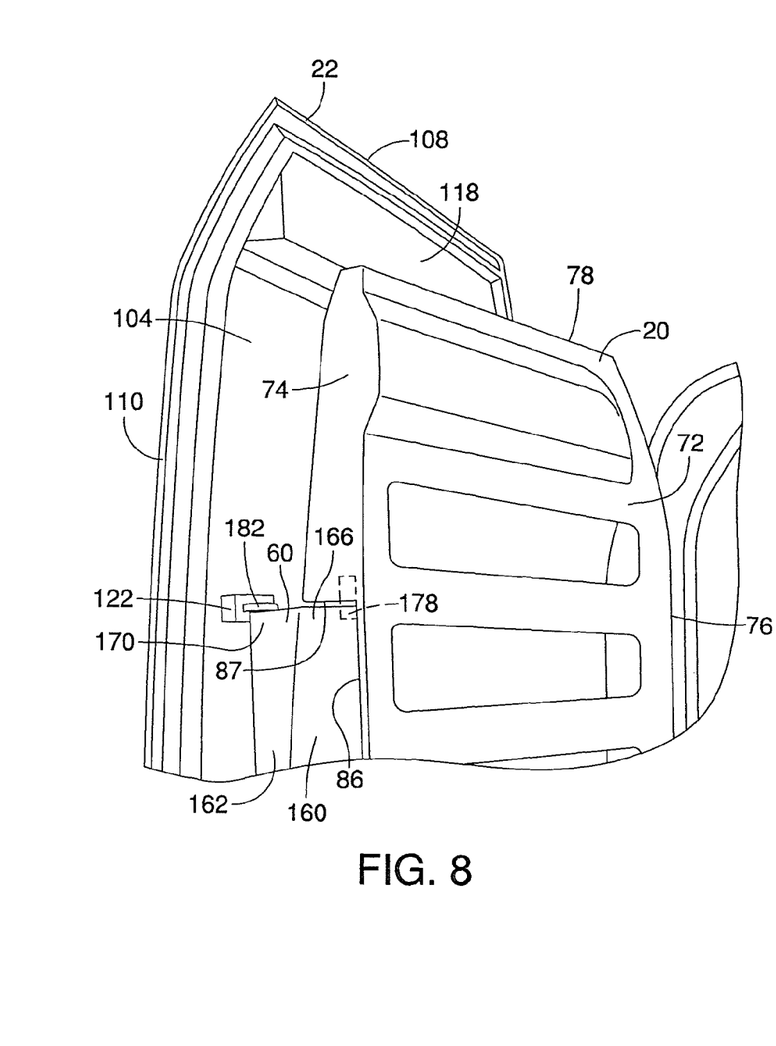
FIG. 8 is an enlarged view of an upper end of the exterior door and the interior panel showing details of a third hinge arrangement supporting the intermediate panel to the interior panel and a fourth hinge arrangement supporting the intermediate panel to the exterior door in accordance with the present invention.

The first side section 74 includes a cutout 86 shown best in FIGS. 5-6 and 8-9. The cutout 86 has an upper end portion 87 (FIGS. 6 and 8). The cutout 86 is dimensioned such that the intermediate panel 60 can pivot in and out of the cutout 86, as described below.

Adjacent to the first side section 74, the compartments 84 and the back section 70 are shaped to define a contoured recess 90 best shown in FIGS. 11 and 12. More specifically, at the first side section 74, each of the compartments 84 narrows in order to provide a space (the recess 90) for the intermediate panel 60 with the exterior door 22 in the closed position. As indicated in FIG. 12, with the exterior door 22 in the closed position, the intermediate panel 60 is disposed within the contoured recess 90. Further, as indicated in FIGS. 6 and 8, cutout 86 is open to the contoured recess 90 such that the intermediate panel 60 can pivot in and out of the contoured recess 90 via the cutout 86.

Figure 7:
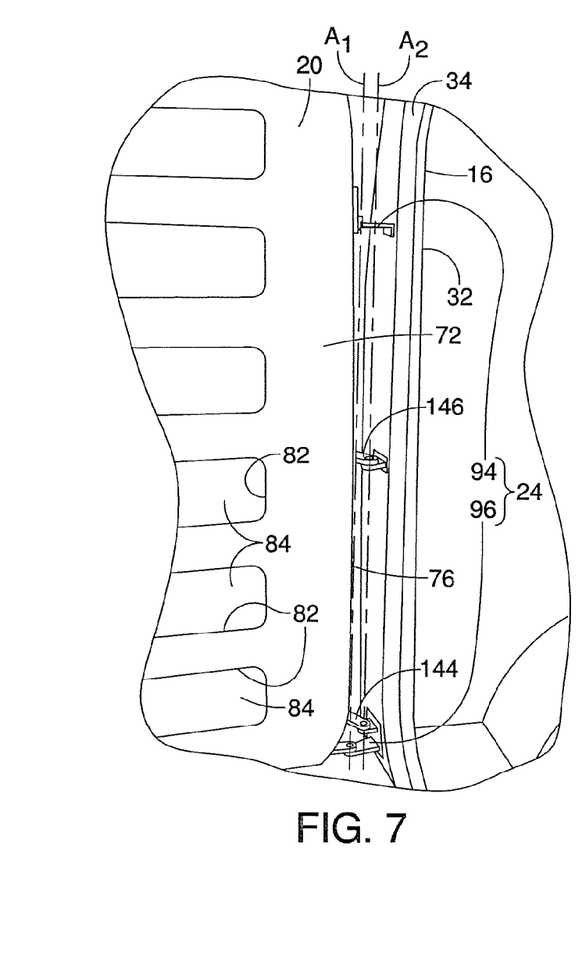
FIG. 7 is another perspective view of the inner side of the exterior door and the interior panel showing details of a first hinge arrangement supporting the interior panel to the vehicle and a second hinge arrangement supporting the exterior door to the vehicle in accordance with the present invention.

As best shown in FIG. 7, the first hinge arrangement 24 is located at the second side section 76 of the interior panel 20. More specifically, the first hinge arrangement 24 pivotally attaches the second side section 76 of the interior panel 20 to the rear pillar structure 32 of the vehicle structure 12. The first hinge arrangement 24 can be configured in any of a variety of ways. For example, the first hinge arrangement 24 can be a single piano-type hinge or can be several smaller hinges that support the interior panel 20 to the vehicle structure 12. However, in the depicted embodiment, the first hinge arrangement 24 includes an upper hinge 94 and a lower hinge 96. The first pivot axis $A_1$ is defined by the upper hinge 94 and the lower hinge 96.

The upper hinge 94 and the lower hinge 96 are conventional hinges that allow the interior panel 20 to pivot relative to the rear of the vehicle 10. The upper hinge 94 and the lower hinge 96 are secured in position by conventional fastening means. For example, the upper hinge 94 and the lower hinge 96 can be attached to the rear pillar structure 32 of the vehicle structure 12 by conventional mechanical fasteners or alternatively can be welded in position. The upper hinge 94 and the lower hinge 96 can be attached to the second side section 76 of the interior panel 20 by conventional mechanical fasteners or alternatively can be welded in position.

As best shown in FIG. 2, the first hinge arrangement 24 has a first effective hinge span that is defined as a distance $S_1$ between a lowest point of the first hinge arrangement 24 and a highest point of the first hinge arrangement 24. More specifically, in the depicted embodiment, the first effective hinge span or the distance $S_1$ is measured between the lowest point of the lower hinge 96 and the highest point of the upper hinge 94, as shown in FIG. 2.

Figure 9:
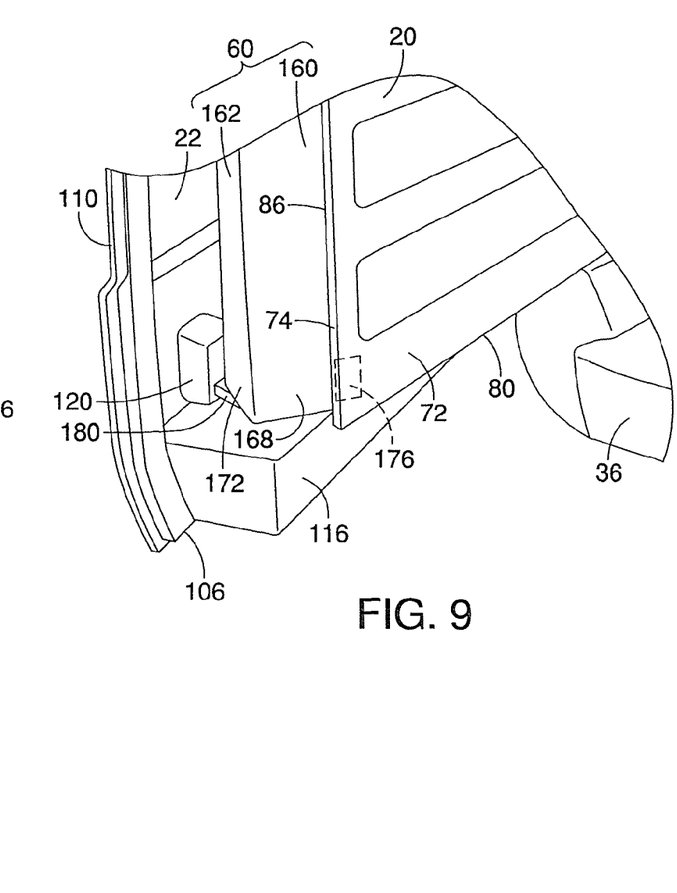
FIG. 9 is an enlarged view of a lower end of the exterior door and the interior panel showing details of the third hinge arrangement supporting the intermediate panel to the interior panel and the fourth hinge arrangement supporting the intermediate panel to the exterior door in accordance with the present invention.
Figure 10:
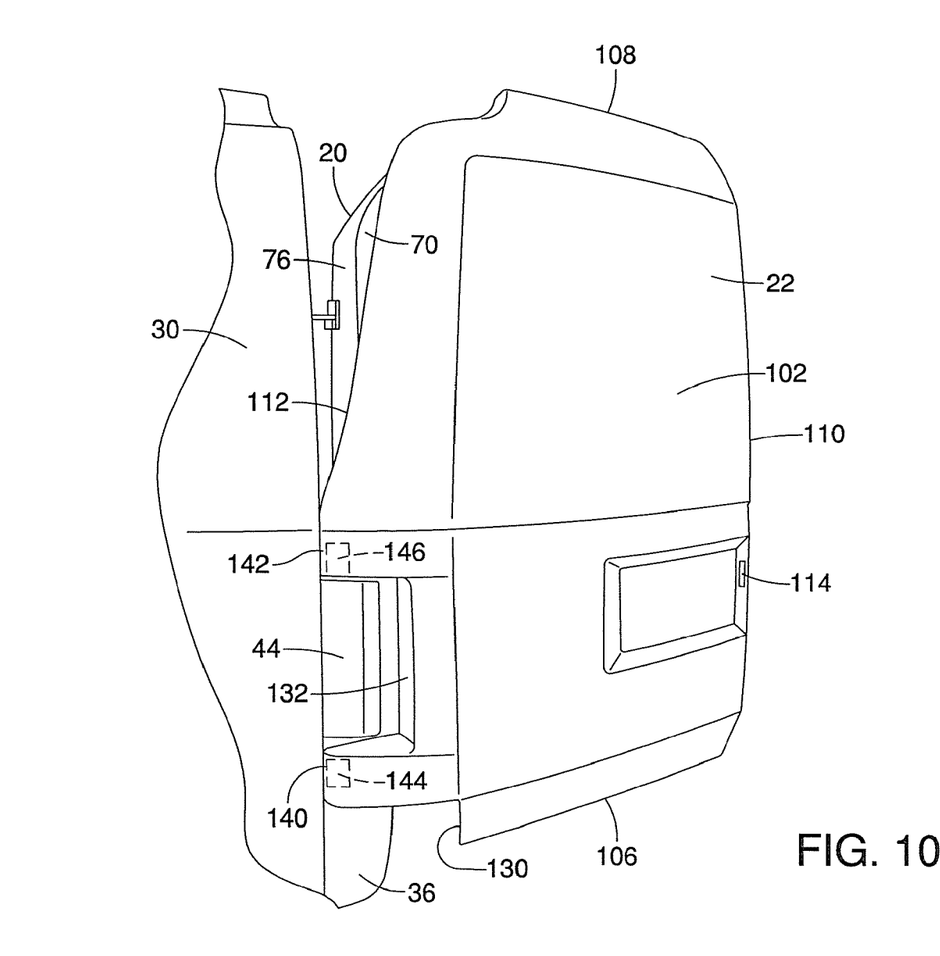
FIG. 10 is a side view of an outer side of the exterior door showing details of the second hinge arrangement supporting the exterior door to the vehicle in accordance with the present invention.

A description of the exterior door 22 is now provided with specific reference to FIGS. 5-6 and 8-10. The exterior door 22 is basically a rigid member made of metal, but can alternatively be made of plastic materials, polymer materials and/or composite materials or combinations thereof. The exterior door 22 includes an outer surface 102 (FIG. 10-12), an inner surface 104 (FIGS. 5, 6 and 8), a lower end 106 (FIGS. 6, 9 and 10), an upper end 108 (FIGS. 5, 6, 8 and 10), a first side section 110 (FIGS. 5-6 and 8-9) and a second side section 112 (FIG. 10). The exterior door 22 has an overall height $H_1$, as shown in FIG. 2.

The outer surface 102 is contoured with a very slight curvature at the first side section 110 that sharpens to a more noticeable curvature at the second side section 112, as indicated from above in FIG. 11-12. Further, the curvature of the outer surface 102 preferably follows and parallels a curved contour of the bumper assembly 36, as is also indicated in FIGS. 1-6. The outer surface 102 is also formed with a license plate recess area that includes a latch release lever 114 best shown in FIGS. 2 and 10.

As best shown in FIGS. 8 and 9, the inner surface 104 of the exterior door 22 includes a lower beam portion 116 (FIG. 9), an upper beam portion 118 (FIG. 8), a first hinge support block 120 (FIG. 9), a second hinge support block 122 (FIG. 8) and a latch mechanism 124 located adjacent to the first side section 110 of the exterior door (see FIGS. 5 and 6).

The lower beam portion 116 is formed with or attached to the exterior door 22 adjacent to the lower end 106 and is provided to add rigidity to the exterior door 22 and also provide support for the intermediate panel 60. The upper beam portion 118 is attached to or formed with the exterior door 22 adjacent to the upper end 108 of the exterior door 22 and also provides rigidity to the exterior door 22. The latch mechanism 124 is operated by the latch release lever 114 in a conventional manner.

As best shown in FIG. 10, the lower end 106 of the exterior door 22 is provided with a cutout 130 at the second side section 112 of the exterior door 22. The cutout 130 conforms approximately to the shape of the end portion of the bumper assembly 36, as best shown in FIG. 2. The upper end 108 is formed with a contour that conforms to the upper section 30a of the side panel portion 30 and the roof panel 38, as best shown in FIGS. 1 and 2. The first side section 110 is generally straight in order to mate with the additional exterior door 64.

As best shown in FIGS. 1 and 10, the second side section 112 includes a cutout 132 dimensioned to conform to the shape of the tail lamp assemblies 44. Below the cutout 132, the second side section 112 includes a lower hinge support portion 140. Above the cutout 132, the second side section 112 includes an upper hinge support section 142.

Referring now to FIGS. 2, 7 and 10, a description of the second hinge arrangement 26 is now provided. The second hinge arrangement 26 is located at the second side section 112 of the exterior door 22. More specifically, the second hinge arrangement 26 pivotally attaches the second side section 112 of the exterior door 22 to the rear pillar structure 32 of the vehicle stricture 12. The second hinge arrangement 26 can be configured in any of a variety of ways. For example, the second hinge arrangement 26 can be a single piano-type hinge or can be several smaller hinges that support the exterior door 22 to the vehicle structure 12. However, in the depicted embodiment, the second hinge arrangement 26 includes a lower hinge 144 and an upper hinge 146. The second pivot axis $A_2$ is defined by the lower hinge 144 and the upper hinge 146.

The lower hinge 144 and the upper hinge 146 are conventional hinges that allow the exterior door 22 to pivot relative to the rear of the vehicle 10. The lower hinge 144 and the upper hinge 146 are secured in position by conventional fastening means. For example, the lower hinge 144 and the upper hinge 146 can be attached to the rear pillar structure 32 of the vehicle structure 12 by conventional mechanical fasteners (not shown) or alternatively can be welded in position. Specifically, the lower hinge 144 is attached to the lower hinge support portion 140 of the second side section 112 of the exterior door 22 by conventional mechanical fasteners (not shown) or alternatively can be welded in position. The upper hinge 146 can be attached to the upper hinge support section 142 of the second side section 112 of the exterior door 22 by mechanical fasteners (not shown) or alternatively can be welded in position.

As indicated in FIG. 2, the second hinge arrangement 26 has a second effective hinge span that is defined as a distance $S_2$ between a lowest point of the second hinge arrangement and a highest point of the second hinge arrangement. More specifically, in the depicted embodiment, the second effective hinge span or the distance $S_2$ is measured between the lowest point of the lower hinge 144 and the highest point of the upper hinge 146.

As is further indicated in FIG. 2, the first hinge arrangement 24 has a first effective hinge span (the distance $S_1$) that is greater than half the height $H_1$ of the exterior door 22. Preferably, the first effective hinge span (the distance $S_1$) is approximately two-thirds of the height $H_1$ of the exterior door 22. The second hinge arrangement 26 has a second effective hinge span (the distance $S_2$) that is less than the first effective hinge span (the distance $S_1$) of the first hinge arrangement 24. Further, the first effective hinge span (the distance $S_1$) of the first hinge arrangement 24 is preferably approximately double the second effective hinge span (the distance $S_2$) of the second hinge arrangement 26. As well, the second hinge arrangement 26 has an effective hinge span (the distance $S_2$) that is less than half an overall height $H_1$ of the exterior door 22. Further, the effective hinge span (the distance $S_2$) of the second hinge arrangement 26 is approximately one-third of the overall height $H_1$ of the exterior door 22.

Figure 13:
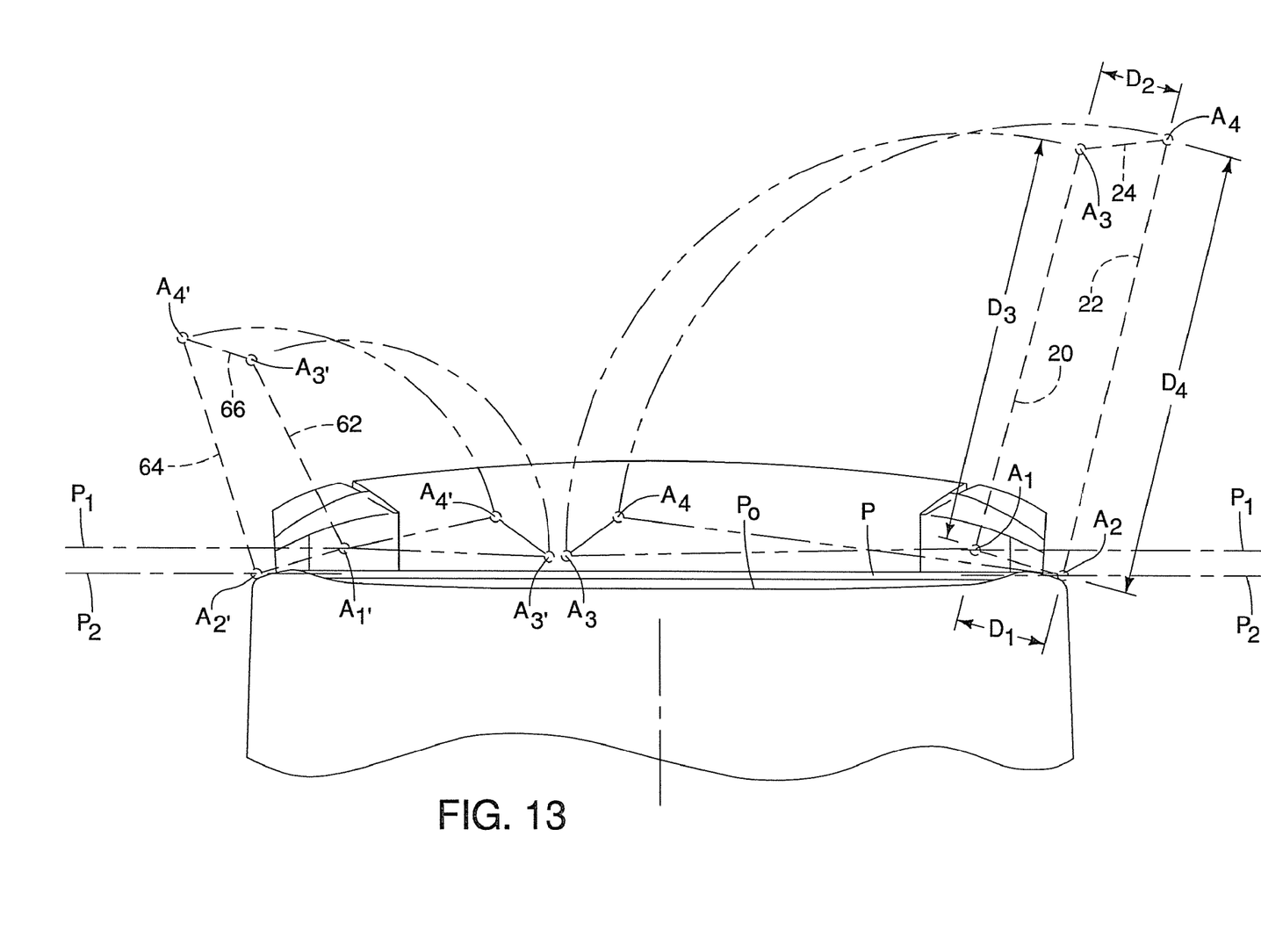
FIG. 13 is a top view of the rear of the vehicle showing a schematic representation of pivot axes of the various hinge arrangements of the exterior door, the additional exterior door, the interior panel, the additional interior panel the intermediate panel and the additional intermediate panel in accordance with the present invention.

As best shown in FIGS. 11 and 13, the first pivot axis $A_1$ of the first hinge arrangement 24 is located in a first vertical plane $P_1$ that is parallel to a vertical plane $P_0$ at least partially containing the opening 16 in the vehicle structure 12. Further, the second pivot axis $A_2$ of the second hinge arrangement 26 is located in a second vertical plane $P_2$ that is parallel to and offset from the first vertical plane $P_1$.

A description of the intermediate panel 60 is now provided with specific reference to FIGS. 5-6 and 8-12. The intermediate panel 60 is a linking member coupling the exterior door 22 to the interior panel 20 slaving movement of the interior panel 20 to movement of the exterior door 22. The linking member 60 is supported to the interior panel 20 for pivotal movement by a third hinge arrangement 150 (see FIG. 2) about a third pivot axis $A_3$ (see FIGS. 2 and 11-13) that is spaced apart from the first pivot axis $A_1$ and the second pivot axis $A_2$. The intermediate panel 60 (the linking member) is also connected to the exterior door 22 for pivotal movement by a fourth hinge arrangement 152 (see FIG. 2) about a fourth pivot axis $A_4$ (see FIGS. 2 and 11-13) that is spaced apart from the first pivot axis $A_1$, the second pivot axis $A_2$ and the third pivot axis $A_3$.

As is indicated in FIG. 2, the effective hinge span of each of the third hinge arrangement 150 and the fourth hinge arrangement 152 is preferably approximately equal to the distance $S_1$. In other words, the effective hinge span of the third hinge arrangement 150 and the fourth hinge arrangement 152 is approximately the same as the first effective hinge span (the distance $S_1$). However, it should be understood from the drawings and description herein that the effective hinge span of the third hinge arrangement 150 and the fourth hinge arrangement 152 can vary according to overall design of the door structure 14 and is not limited to the disclosed and depicted dimensions.

The intermediate panel 60 can be made of metal, metal alloys, polymer materials, plastic materials, composite materials, wood, wood veneer products and/or combinations thereof. The intermediate panel 60 is preferably a rigid member configured to resist twisting and deformation. More specifically, the intermediate panel 60 is dimensioned and designed to support a portion of downward gravitational force acting on the exterior door 22 when the exterior door 22 is in the open position. Further, the intermediate panel 60 is dimensioned and designed to transfer that portion of the downward gravitational force acting on the exterior door 22 to the interior panel 20. Thus, the intermediate panel 60 is dimensioned to withstand the twisting force corresponding to the transfer of weight from the exterior door 22 to the interior panel 20.

As best shown in FIGS. 8, 9, 11 and 12, the interior panel 60 has an L-shape or V-shape and includes a first vertically extending section 160, a second vertically extending section 162, an edge 164 defined between the first and second vertically extending sections 160 and 162, the third hinge arrangement 150 and the fourth hinge arrangement 152. The first vertically extending section 160 has an upper end 166 and a lower end 168. The second vertically extending section 162 also has an upper end 170 and a lower end 172.

As best shown in FIGS. 2, 8 and 9, the third hinge arrangement 150 includes a lower hinge 176 (FIGS. 2 and 9) and an upper hinge 178 (FIGS. 2 and 8) that define the third pivot axis $A_3$ (FIG. 2). The lower hinge 176 and the upper hinge 178 are conventional hinges that allow the intermediate panel 60 to pivot relative to the interior panel 20 when the exterior door 22 is moved between the open position and the closed position. The lower hinge 176 and the upper hinge 178 are secured in position by conventional fastening means (not shown). For example, as indicated in phantom in FIG. 9, the lower hinge 176 is fixed to the lower end 168 of the first vertically extending section 160 of the intermediate panel 60 by mechanical fasteners or alternatively can be welded in position. Further, the lower hinge 176 is also fixed to the back section 70 of the interior panel 20 proximate a lower portion of the contoured recess 90 by conventional mechanical fasteners (not shown) or alternatively can be welded in position.

As indicated in FIG. 8, the upper hinge 178 is attached to upper end 166 of the first vertically extending section 160 of the intermediate panel 60 by conventional mechanical fasteners (not shown) or alternatively can be welded in position. The upper hinge 178 is further attached to the upper end portion 87 of the recess 86 of the first side section 74 of the interior panel 20 by mechanical fasteners or alternatively can be welded in position. Consequently, position of the third pivot axis $A_3$ is fixed relative to the first vertically extending section 160 of the intermediate panel 60 and the first side section 74 of the interior panel 20.

As shown in FIGS. 2, 8 and 9, the fourth hinge arrangement 152 includes a lower hinge 180 (FIGS. 2 and 9) and an upper hinge 182 (FIGS. 2 and 8) that define the fourth pivot axis $A_4$ (FIG. 2). The lower hinge 180 and the upper hinge 182 are conventional hinges that allow the intermediate panel 60 to pivot relative to the exterior door 22 as the exterior door 22 is moved between the open position and the closed position. The lower hinge 180 and the upper hinge 182 are secured in position by conventional fastening means. For example, as indicated in FIG. 9, the lower hinge 180 is fixed to the first hinge support block 120 on the inner surface 104 of the exterior door 22 by conventional mechanical fasteners (not shown) or alternatively can be welded in position. Further, the lower hinge 180 is also fixed to lower end 172 of the second vertically extending section 162 of the intermediate panel 60 by conventional mechanical fasteners (not shown) or alternatively can be welded in position.

As shown in FIG. 8, the upper hinge 182 is attached to upper end 170 of the second vertically extending section 162 of the intermediate panel 60 by conventional mechanical fasteners (not shown) or alternatively can be welded in position. The upper hinge 182 is further attached to the second hinge support block 122 of the inner surface 104 of the exterior door 22 by mechanical fasteners or alternatively can be welded in position. Consequently, position of the fourth pivot axis $A_4$ is fixed relative to the second vertically extending section 162 of the intermediate panel 60 and the inner surface 104 of the exterior door 22.

As is best shown in FIG. 13, the first pivot axis $A_1$ and the second pivot axis $A_2$ are spaced apart from one another by a first distance $D_1$. The third pivot axis $A_3$ and the fourth pivot axis $A_4$ are spaced apart from one another by a second distance $D_2$ that is shorter than the first distance $D_1$. The first pivot axis $A_1$ and the third pivot axis $A_1$ are spaced apart from one another by a third distance $D_3$ and the second pivot axis $A_2$ and the fourth pivot axis $A_4$ are spaced apart from one another by a fourth distance $D_4$ that is longer than the third distance $D_3$.

In the depicted embodiment, the first, second, third and fourth pivot axes $A_1$, $A_2$, $A_3$ and $A_4$ do not define a parallelogram, but rather have a quadrilateral relationship where the distances $D_1$, $D_2$, $D_3$ and $D_4$ are not equal to one another ($D_1 \neq D_2 \neq D_3 \neq D_4$). This quadrilateral relationship accomplishes several engineering tasks. First, the interior panel 20 is able to support at least forty percent (or more) of the downward gravitational force acting on the exterior door 22 proximate the first side section 110 of the exterior door 22 with the exterior door 22 in the open position. Consequently, the second effective hinge span (the distance $S_2$) of the second pivot axis $A_2$ can be shorter than the first effective hinge span (distance $S_1$) of the first pivot axis $A_1$. More specifically, the second hinge arrangement 26 can be configured with the lower hinge 144 and the upper hinge 146 being closer to one another with the upper hinge 94 and the lower hinge 96 of the first hinge arrangement 24 being further apart from one another.

Further, with the exterior door 22 in the open position, as shown in FIGS. 4, 6 and 11, the interior panel 20 pivots a greater angular distance about the first axis $A_1$ than the exterior door 22 pivots about the second axis $A_2$. In other words, the exterior door 22 pivots approximately 96 degrees about the second axis $A_2$ moving between the closed position and the open position, as represented in FIG. 13. Meanwhile, the interior panel 20 pivots more than 105 degrees about the first axis $A_1$ moving between the closed position to the open position, as represented in FIG. 13. Thus, the interior panel 20 is positioned such that there is easy access to the bin openings 82 and the compartments 84.

It should be understood from the drawings and the description herein that the respective distances $D_1$, $D_2$, $D_3$ and $D_4$ between the first, second, third and fourth pivot axes $A_1$, $A_2$, $A_3$ and $A_4$ can be adjusted and changed such that the distances $D_1$, $D_2$, $D_3$ and $D_4$ define a parallelogram or other four sided relationship. In other words, the present invention is not limited to the specific geometry of the depicted embodiment.

As indicated in FIGS. 2 and 11-15, the additional interior panel 62, the additional exterior door 64 and the additional intermediate panel 66 share the same basic geometric relationships to one another as with the interior panel 20, the exterior door 22 and the intermediate panel 24. Specifically, the additional interior panel 62 is pivotally supported to the vehicle structure 12 for pivotal movement by a first additional hinge arrangement 24'. The additional exterior door 64 is pivotally supported to the vehicle structure 12 for pivotal movement by a second additional hinge arrangement 26'. The additional exterior door 64 is supported to the additional interior panel 62 such that the additional interior panel 62 and the additional exterior door 64 move together as the exterior door 64 is moved between an open position and a closed position. Further, as shown in FIG. 2, the additional exterior door 64 has a contoured edge 64a that mates with the exterior door 22 when the exterior door 22 and the additional exterior door 64 are in the closed positions, respectively.

The first additional hinge arrangement 24' includes a pair of hinges that define a first additional pivot axis $A_{1'}$ in a manner consistent with the first additional hinge arrangement 24. The second additional hinge arrangement 26' includes a pair of hinges that define a second additional pivot axis $A_{2'}$ in a manner consistent with the second additional hinge arrangement 26'. The additional interior panel 62 is pivotally connected to the additional interior panel 62 by a third additional hinge arrangement 150' in a manner similar to the third hinge arrangement 150. The additional interior panel 62 is also pivotally connected to the additional exterior door 64 by a fourth additional hinge arrangement 152' in a manner similar to the fourth hinge arrangement 152.

Figure 14:
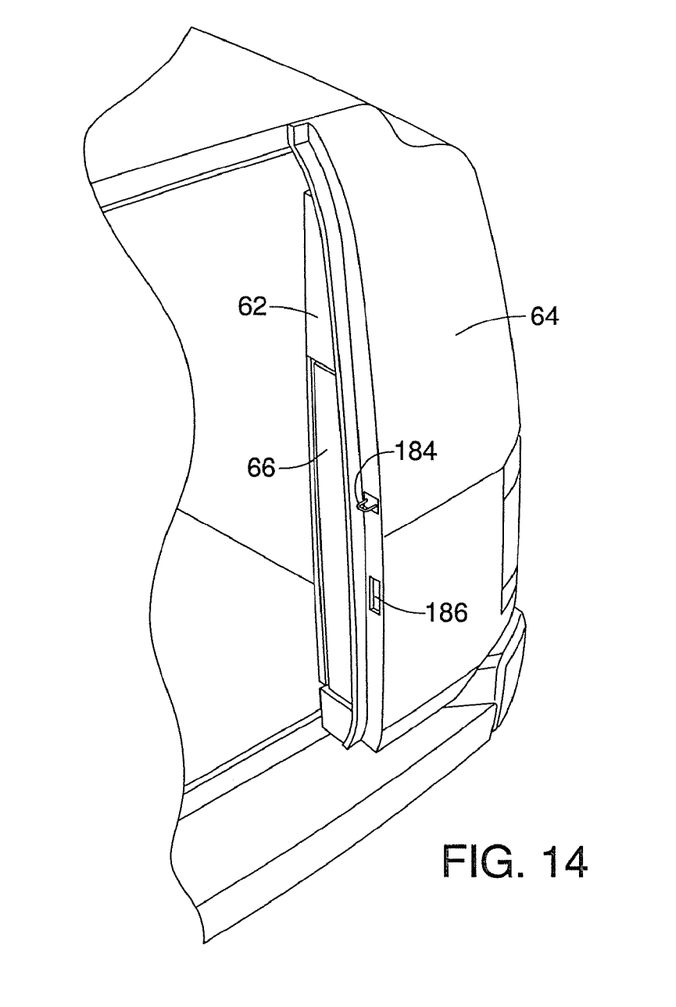
FIG. 14 is a perspective view of the rear of the vehicle showing the additional exterior door in the closed position in accordance with the present invention.

The additional exterior door 64 includes a conventional striker bar 184 dimensioned to engage the latch mechanism 124 on the inner surface 104 of the exterior door 22. The additional exterior door 64 also includes a conventional latching mechanism (not shown) that engages the vehicle structure 12 at the top and bottom of the opening 16 operated by a lever mechanism 186, as shown in FIG. 14.

The additional interior panel 62, the additional exterior door 64 and the additional intermediate panel 66, and respective ones of the interior panel 20, the exterior door 22 and the intermediate panel 24 differ from one another primarily relating to basic dimensions. Specifically, as shown in FIG. 2, the additional exterior door 64 has a smaller horizontal width than the exterior door 22. However, it should be understood from the drawings and the description herein that the exterior door 22 and the additional exterior door 64 can have the same horizontal width and are not limited to the depicted embodiment. Similarly, the additional interior panel 62 has a smaller horizontal width than the interior panel 20. The basic geometric relationships between the first, second, third and fourth pivot axis $A_{1'}, A_{2'}, A_{3'}$ and $A_{4'}$ are the similar or the same as the geometric relationships between the first, second, third and fourth pivot axes $A_1$, $A_2$, $A_3$ and $A_4$, except that the relative distances between the first, second, third and fourth pivot axes $A_{1'}$, $A_{2'}$, $A_{3'}$ and $A_{4'}$ differ from the relative distances between the first, second, third and fourth pivot axes $A_1, A_2, A_3$ and $A_4$.

Since the basic relationships (except for relative distances and overall dimensions) between the first, second, third and fourth pivot axes $A_{1'}, A_{2'}, A_{3'}$ and $A_{4'}$ and the first, second, third and fourth pivot axes $A_1, A_2, A_3$ and $A_4$ are generally the same, further description of the additional interior panel 62, the additional exterior door 64 and the additional intermediate panel 66 is omitted for the sake of brevity.

The remaining elements and components of the vehicle structure 12 are conventional components that are well known in the art. Since these elements and components of the vehicle structure 12 are well known in the art, these elements and structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware that is constructed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The strictures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door structure comprising:
    a vehicle structure formed with an opening;
    an interior panel being pivotally connected to the vehicle structure for pivotal movement by a first hinge arrangement about a first pivot axis; and
    an exterior door being pivotally directly connected to the vehicle structure for pivotal movement by a second hinge arrangement about a second pivot axis that is spaced apart from the first pivot axis, and the exterior door being supported to the interior panel such that the interior panel and the exterior door move together as the exterior door is moved between an open position and a closed position at least partially concealing the opening.

2. The vehicle door structure according to claim 1, wherein the first hinge arrangement has a first effective hinge span that is greater than half an overall height of the exterior door, where the first effective hinge span of the first hinge arrangement is defined as a distance between a lowest point of the first hinge arrangement and a highest point of the first hinge arrangement.

3. The vehicle door structure according to claim 2, wherein the first effective hinge span of the first hinge arrangement is approximately two-thirds of the overall height of the exterior door.

4. The vehicle door structure according to claim 2, wherein the second hinge arrangement has a second effective hinge span that is less than the first effective hinge span of the first hinge arrangement, where the second effective hinge span of the second hinge arrangement is defined as a distance between a lowest point of the second hinge arrangement and a highest point of the second hinge arrangement.

5. The vehicle door structure according to claim 4, wherein the first effective hinge span of the first hinge arrangement is approximately double the second effective hinge span of the second hinge arrangement.

6. The vehicle door structure according to claim 1, wherein the second hinge arrangement has an effective hinge span that is less than half an overall height of the exterior door, wherein the effective hinge span of the second hinge arrangement is defined as a distance between a lowest point of the second hinge arrangement and a highest point of the second hinge arrangement, and
    the effective hinge span of the second hinge arrangement is approximately one-third of the overall height of the exterior door.

7. The vehicle door structure according to claim 1, further comprising a linking member coupling the exterior door to the interior panel slaving movement of the interior panel to movement of the exterior door.

8. The vehicle door structure according to claim 7, wherein the linking member is supported to the interior panel for pivotal movement by a third hinge arrangement about a third pivot axis that is spaced apart from the first and second pivot axes.

9. The vehicle door structure according to claim 8, wherein the linking member is connected to the exterior door for pivotal movement by a fourth hinge arrangement about a fourth pivot axis that is spaced apart from the first, second and third pivot axes.

10. The vehicle door structure according to claim 9, wherein
the first pivot axis and the second pivot axis are spaced apart from one another by a first distance, and
the third pivot axis and the fourth pivot axis are spaced apart from one another by a second distance that is shorter than the first distance.

11. The vehicle door structure according to claim 10, wherein
the first pivot axis and the third pivot axis are spaced apart from one another by a third distance, and
the second pivot axis and the fourth pivot axis are spaced apart from one another by a fourth distance that is longer than the third distance.

12. The vehicle door structure according to claim 1, wherein
the interior panel includes a storage space accessed via at least one opening on an inner surface of the interior panel.

13. The vehicle door structure according to claim 1, wherein
the first pivot axis of the first hinge arrangement is laterally spaced apart from the second pivot axis of the second hinge arrangement.

14. The vehicle door structure according to claim 1, wherein
a first effective hinge span of the first hinge arrangement is larger than a second effective hinge span of the second hinge arrangement.

15. A vehicle door structure comprising:
a vehicle structure including a pair of side panel portions with an opening being located at a rear end of the vehicle structure between the side panel portions;
an interior panel being pivotally supported to the vehicle structure for pivotal movement by a first hinge arrangement about a first pivot axis; and
an exterior door being pivotally supported to the vehicle structure for pivotal movement by a second hinge arrangement about a second pivot axis that is spaced apart from the first pivot axis, the exterior door being supported to the interior panel such that the interior panel and the exterior door move together as the exterior door is moved between an open position and a closed position at least partially concealing the opening, and each of the side panel portions of the vehicle structure having contoured surfaces such that respective upper sections of the side panel portions are offset inwardly in a horizontal direction from respective lower sections of the side panel portions, with the first pivot axis of the first hinge arrangement being disposed laterally inward of the upper sections of the side panel portions and the second hinge arrangement being disposed laterally outward of the upper sections of the side panel portions.

16. A vehicle door structure comprising:
a vehicle structure formed with an opening;
an interior panel being pivotally supported to the vehicle structure for pivotal movement by a first hinge arrangement about a first pivot axis;
an exterior door being pivotally supported to the vehicle structure for pivotal movement by a second hinge arrangement about a second pivot axis that is spaced apart from the first pivot axis, and the exterior door being supported to the interior panel such that the interior panel and the exterior door move together as the exterior door is moved between an open position and a closed position at least partially concealing the opening;
an additional interior panel being pivotally supported to the vehicle structure for pivotal movement by a first additional hinge arrangement; and
an additional exterior door pivotally supported to the vehicle structure for pivotal movement by a second additional hinge arrangement with the additional exterior door being supported to the additional interior panel such that the additional interior panel and the additional exterior door move together as the additional exterior door is moved between an open position and a closed position.

17. The vehicle door structure according to claim 16, wherein
the additional exterior door has a contoured edge that mates with the exterior door when the exterior door and the additional exterior door are both in respective closed positions.

18. The vehicle door structure according to claim 16, wherein
the additional exterior door conceals less of a lateral width of the opening than the exterior door when the exterior door and the additional exterior door are both in respective closed positions.

19. The vehicle door structure according to claim 1, wherein
the exterior door conceals the interior panel with the exterior door positioned in the closed position viewed from an exterior of the vehicle structure.

20. The vehicle door structure according to claim 1, wherein
the first pivot axis and the second pivot axis are vertically oriented relative to the vehicle structure.

* * * * *